US012745806B2

(12) United States Patent
Korniiuk et al.

(10) Patent No.: US 12,745,806 B2
(45) Date of Patent: Sep. 29, 2026

(54) ANALYTICAL TESTING SYSTEM AND METHOD FOR VAPING DEVICES

(71) Applicant: HOKORD LIMITED, Sheung Wan (HK)

(72) Inventors: Artur Korniiuk, Zhytomyr (UA); Oleksandr Yatsenko, Dnipro city (UA); Volodymyr Smolkin, Zhytomyr (UA)

(73) Assignee: HOKORD Limited, Sheung Wan (HK)

( * ) Notice: Subject to any disclaimer, the term of this patent is extended or adjusted under 35 U.S.C. 154(b) by 1081 days.

(21) Appl. No.: 17/888,363

(22) Filed: Aug. 15, 2022

(65) Prior Publication Data

US 2023/0148276 A1 May 11, 2023

Related U.S. Application Data

(60) Provisional application No. 63/278,390, filed on Nov. 11, 2021.

(51) Int. Cl.
*A24F 40/80* (2020.01)
*G01M 99/00* (2011.01)

(52) U.S. Cl.
CPC .......... *A24F 40/80* (2020.01); *G01M 99/005* (2013.01); *G01M 99/008* (2013.01)

(58) Field of Classification Search
CPC ...... A24F 40/80; A24F 40/10; G01M 99/005; G01M 99/008
USPC .......... 702/45
See application file for complete search history.

(56) References Cited

U.S. PATENT DOCUMENTS 11,812,777 B2 * 11/2023 Cali .......... A24C 5/34
12,089,658 B2 * 9/2024 Jain .......... A24F 40/60

FOREIGN PATENT DOCUMENTS

EP 3085251 A1 * 10/2016 .......... A24C 5/3424

* cited by examiner

*Primary Examiner* — Aditya S Bhat
(74) *Attorney, Agent, or Firm* — INVENTA CAPITAL GROUP PLC

(57) ABSTRACT

An analytical vape testing system comprises an operating circuit connected to a measuring circuit. The operating circuit comprises at least a main module. The measuring circuit is formed by a number of measuring units. The main module is equipped with a vapor flow sensing unit, a vapor flow state signal unit and a vapor flow density control unit. The vapor flow sensing unit is designed in data connection with a vaping stability detecting unit of the operating circuit.

9 Claims, 8 Drawing Sheets

ANALYTICAL TESTING SYSTEM AND METHOD FOR VAPING DEVICES

FIELD OF INVENTION

The present invention relates generally to the field of analyzing, testing and measuring parameters of smoking products that may be inhaled by a person, and corresponding vaping devices. It relates more particularly to an analytical testing system and method adapted to analyze at least one vaping device.

BRIEF DESCRIPTION OF THE INVENTION

The known vaping devices work by heating and vaporizing liquid which is then inhaled by the user. Vaping devices, also known as Electronic Nicotine Delivery Systems (ENDS), electronic cigarettes or e-cigarettes were developed as an alternative to tobacco cigarettes. Vaping devices typically comprise a mouthpiece, a tank, an atomizer, a control unit, a battery and a control panel. The liquid to be vaporized (the “e-liquid” or “e-juice”) is contained in the tank. The tank may be replaceable or refillable. During using a vaping device, the heating element atomises the e-liquid to create an aerosolized vapor which is inhaled by the user.

The efficiency and quality of operation of the vaping devices are significantly dependent on such parameters as: vapor and environment temperature, pressure drops, presence of harmful impurities, the vaping device air channels defects, type of e-liquid etc. Good balance of the mentioned parameters list allows an efficient and stable operation of the vaping device and must be ensured during the development and manufacturing of such vaping devices. Any device of a production lot must comply with the standards and guarantee stability of a vaping device.

The stability of a vaping device, according to the claimed invention, is the ability of a vaping device to provide an operation parameter mentioned by the manufacturer, such as specified evaporation rates throughout each vaping device operation session during the life cycle.

Most manufacturers provide vaping devices testing methods, technologies and systems which allow to determine the proper quality of their products.

The vaping devices based on e-liquid evaporation have become widespread. The new technologies are able to implement new testing systems for studying parameters of electronic cigarettes, for example, the CETI8 system from Cerulean. The term “CETI” is an acronym for “Cerulean e-Cigarette Testing Instrument”. This system allows an operator to select the shape, volume and duration of puffs of the diffused product, as well as the number of puffs and pauses between them for capturing vapors at a buffer-filter for an off-line chemical analysis.

The known test systems are becoming popular and are on the stage of technology development. The main directions of development comprise improvements of mobility, automation, measurement accuracy, expanding the range of applications. The present invention allows to improve ergonomics, in particular, simplicity and ease of use, as well as versatility for any needs of manufacturers, suppliers and distributors.

Timely identified defects of a vaping device allow to eliminate risks associated with the use of a faulty or a low-quality vaping device, in particular, may become harmful to the users’ health.

The patent GB2588113A (Cole Akinwande, priority date 10 Jul. 2019) studies the apparatus and method for testing a tobacco heating product. The apparatus comprises: means for puffing the product; means for sensing the temperature of gas downstream of the product; and means for generating a status signal indicating the heating status of the product in dependence on the sensed temperature.

The apparatus may also remove particles from the aerosol drawn from the product and/or capture particles for further analysis.

The means for sensing temperature (i.e. thermocouple sensor, thermistor, resistance thermometer, silicon bandgap/optical/solid-state temperature sensor) may produce a temperature signal depending on the difference between the temperature of the gas stream and ambient temperature, wherein said temperature signal is compared to a threshold value. The control unit may cease or modify puffing the product 1, and/or may output an alarm, in dependence on the status signal. The product 1 may comprise a tobacco heated stick heated by an external electrical heating system, an internal electrical heating system, a sustainably self-heating tip (i.e. carbon tip), or by means of a chemical reaction.

Also a testing apparatus with dry wick indicator and a method of indicating the dry wick condition in a vaping device is known from the prior art (a patent GB2571999A, Francis Tindall Ian, priority date 16 Mar. 2018). The dry wick indicator for a vaping device comprises a detecting means for detecting a decomposition product from a vaping device, and means for producing a signal indicating dry wick condition based on an output of the detecting means. The indicator may further comprise a discriminator for comparing an output of the detector with a reference, wherein the signal is output based on the result of the comparison. The decomposition product may be formed by pyrolysis, thermal degradation or combustion of e-liquid base, may not be present in the e-liquid from which vapor is produced, and may be selected from carbon monoxide, carbon dioxide, formaldehyde, acetone, acrolein and/or acetaldehyde. The detecting means may use non-dispersive infrared spectroscopy. Fourier transform infrared spectroscopy, colorimetric analysis and/or reversible oxidation, and/or may comprise an electromechanical cell having a working electrode, a reference electrode and a counter electrode in contact with an electrolyte. Detecting means using a detection technique selected from at least one of: nondispersive infrared spectroscopy; Fourier Transform infrared spectroscopy; colorimetric analysis; and reversible oxidation. The detecting means comprises an electrochemical cell.

The closest technical solution to the present invention is described in the patent EP2959783B1 (Daniel Eclache, priority date 23 Jun. 2014). The machine for analyzing at least one diffusion device for a product capable of being aspirated, respirated, or inhaled by a user of the diffusion device and/or for analyzing a product diffused by such a diffusion device, comprises: an automatic control device, an inlet compartment with a controlled atmosphere, at least one actuator attached to the diffusion device and controlled by the automatic control device, at least one element for regulating the temperature and/or the humidity of the atmosphere in the inlet compartment, at least one element for regulating the pressure, temperature, and/or humidity in the outlet compartment, at least one ventilation element connected to the diffusion device being controlled by the automatic control device in such a way as to produce ventilation with predetermined characteristics, at least one analysis hardware element allowing for the analysis of a flow diffused by the diffusion device.

The analysis hardware comprises an element for taking samples of the flow for a physical-chemical analysis of the product diffused by the diffusion device and returned to the outlet compartment.

The described technical solutions and methods which are known from the prior art, substantially present testing equipment for laboratories. Such equipment needs special additional supporting frame structures, ventilated compartments, with constant operating conditions for better measurements accuracy. Also such laboratory equipment is designed as a non-mobile and single-purpose machine which may be difficult to operate.

Also obtained test results do not allow to assess the stability of vaping devices in the real time, since measurement of individual parameters allows to make decisions only on the basis of all tests. At the same time, for example, changes of any parameter do not allow fixing changes in the operation of the entire system during a single test at each point of time.

Unfortunately, these prior art design present numerous disadvantages. There is always a need for an improved device that is easy to assemble/disassemble and manufacture.

SUMMARY OF THE INVENTION

The problem solved by the invention is aimed to create a system and method to provide the real-time control of the stability of a vaping device by defining a group of parameters. The stability of a vaping device is defined by means of determining a particular parameter based on which the factors affecting the stability of a vaping device in a complex are identified, wherein defining the parameters is realized with a high speed and accuracy.

The essence of the invention is aimed at improving the environmental friendliness, the ergonomics of the testing system and method by creating a modular unified analytical testing system for vaping devices and optimizing the analytical testing system in real-time operation mode.

In order to achieve a technical result an analytical testing system for vaping devices comprises an operating circuit (OC) connected to a measuring circuit (MC). The measuring circuit is formed by a number of measuring units (MU). Each of the measuring units is designed as a separate enclosed module equipped with a mechatronic components set. Wherein the mechatronic components set comprises, at least, a vaping device, a vapor channel, a pump unit, a vapor flow sensing unit, an MU data control block, an MU sensor set control unit, and the pump unit equipped with a step-motor. Dimension dependence between the measuring unit components based on the parameters of a vaping device is established.

The operating circuit comprises at least a main module, wherein the main module (MM) is equipped with an OC data control unit, a vapor flow state signal unit (FSCU), a vapor flow density control unit (VFDC).

At least one of the measuring units comprises a dedicated mechatronic components set. Also, there may be a variant wherein each of the measuring units comprises an equal mechatronic components set.

According to the present variant of the invention, each of the measuring units comprises at least a flow sensing unit, a pressure drop sensor, a vapor flow temperature sensor, a harmful impurities sensor, and a step-motor position sensor.

According to the present structure of the analytical testing system the flow density control unit comprises, at least, a memory unit with the parameters database of a vaping device, a dimensions dependence control unit, a product weight control unit.

Based on the described variant of the analytical testing system, the analytical testing method for vaping devices provides steps of using the operating circuit for providing data operating and forming a real-time vaping device operation stability parameter depending on the flow state parameters within the vapor channel. Providing the vapor flow state parameters is based on at least the vapor flow sensing unit signal, the parameters of a vaping device, dimension dependence parameters of the measuring unit components, and the MU sensor set control unit signals.

On the next step, using a dynamic changing of at least one of the flow state parameters as a marker of the real-time instability of a vaping device. Comparing and analyzing an interdependence of the MU sensor set parameters depend on dynamic changing of at least one of the flow state parameters fixed within the vapor channel.

Wherein comparing and analyzing the interdependence of the MU sensor set parameters depend on changes of at least the vapor flow density dynamic parameters fixed within the vapor channel.

Based on the preferred embodiment of the present invention, monitoring of the vapor flow state parameters is based on the vapor flow density parameter fixed within the vapor channel. Providing the vapor flow density parameter is based on at least the vapor flow reflected light signal related to the weight of a vaping device, the product type, the dimension dependence parameters of the measuring unit components.

According to the present variant of the invention, dividing the operating circuit into two parts, and providing the first operating circuit part on the basis of the main module, and providing the second operating circuit part within a web-browser environment based on a user's device, wherein showing the real-time stability parameters of vaping device operation within a web-browser environment. Based on the real-time stability parameters of a vaping device operation forming the vaping device testing report, and providing the stability parameters of a vaping device operation with a task for stability optimization of a vaping device.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
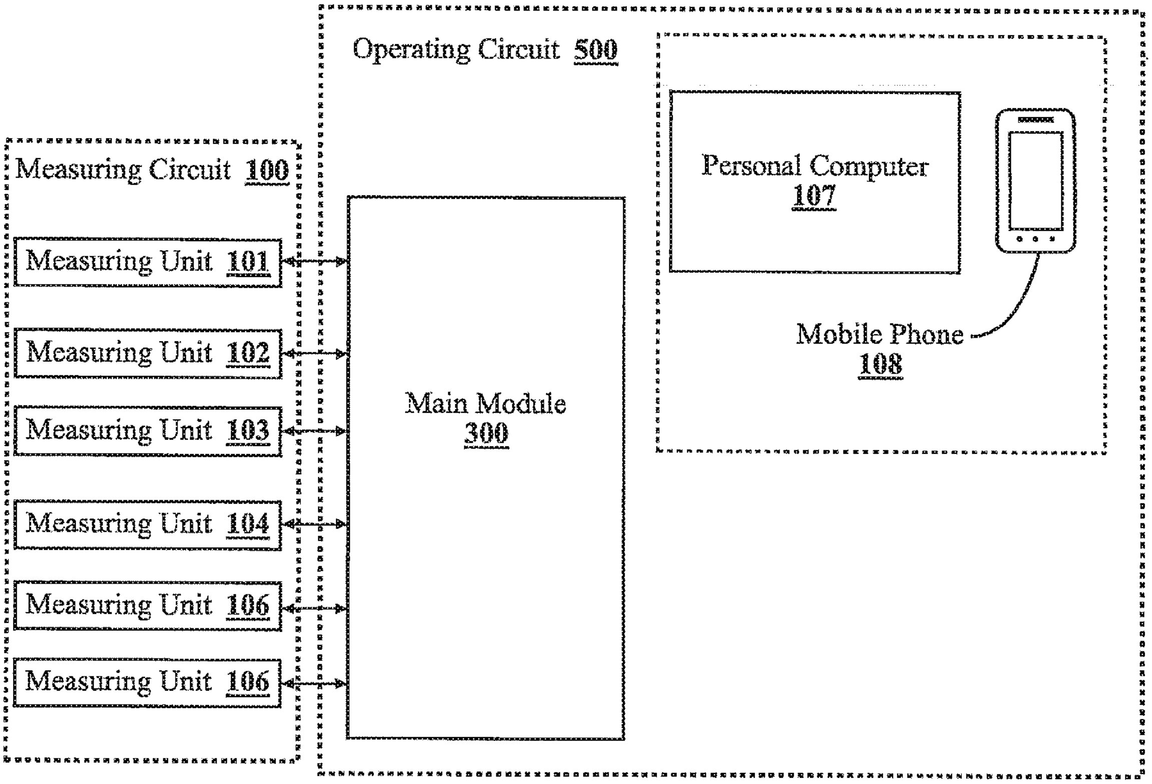
FIG. 1 is the structure of an analytical testing system for vaping devices.

Referring to description of the present invention, the words “inner”, “inwardly” and “outer”, “outwardly” refer to directions toward and away from, respectively, a designated centerline or a geometric center of an element being described, the particular meaning being readily apparent from the context of the description. Additionally, as used herein, the singular forms “a,” “an,” and “the” include plural referents unless the context clearly dictates otherwise.

Thus, for example, the term “module” is intended to mean one or more modules or a combination of modules. Furthermore, as used herein, the term “based on” includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments.

These example embodiments, which are also referred to herein as “examples,” are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms “or” and “and” shall mean “and/or” unless stated otherwise or clearly intended otherwise by the context of their use. The term “a” shall mean “one or more” unless stated otherwise or where the use of “one or more” is clearly inappropriate. The terms “comprise,” “comprising,” “include,” and “including” are interchangeable and not intended to be limiting. For example, the term “including” shall be interpreted to mean “including, but not limited to.”

Accordingly, as maybe used herein, terms such as “identifier of an object” and “memory address of an object” should be understood to refer to the identifier (e.g., memory address) itself or to a variable at which a value representing the identifier is stored. As used herein, the term “module” refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Referring now to the drawings and the illustrative embodiments depicted therein, various embodiments of the invention comprise systems and methods for providing an analytical testing system and method for vaping devices to control the stability of a vaping device operation by defining a group of parameters.

According to the present description, the given terms may have the following definitions: analytical testing system—a group of interacting or interrelated elements that act according to a set of rules to collect, accumulate, store, process, analyze and display data related to real-time parameters of the operation stability of a vaping device. Measuring circuit—a measuring unit or a group of measuring units with a set of mechatronic components or a separate set of mechatronic components for providing collection of product samples, physical parameters and vapor flow parameters.

Operating circuit—an analytical hardware and software complex for providing data processing and results formation based on parameters obtained (collected) by the measuring circuit.

Vaping device—an electronic nicotine delivery system (ENDS) delivering nicotine from sticks or elements containing the product, which are non-combustible tobacco products, including E-cigarettes, vaporizers, vape pens, hookah pens, e-cigarettes, and e-pipes.

Vapor flow state—qualitative and quantitative vapor parameters within a vapor channel and displayed in precise physical values (volume, weight, etc.).

Vapor flow density—is a quantitative parameter characterizing qualitative changes of the vapor structure within the vapor channel of the measuring circuit. For example, a degree of vapor saturation by a product.

Product—a vaporized substance used as liquid for smoking (“Vape Juice”, “e-liquid”); vapor flow sensing unit—software and hardware complex comprising an optical sensor for determining the vapor structure, in data connection with the central processor unit of the operating circuit.

Test programs—a sequence and a number of the vaping device tests given by operator with certain parameters according to the testing methodology, wherein a set of parameters comprises, at least the type of a vaping device, product volume, testing time, puff count, puff volume, puff duration, puff frequency (puffs/min), etc.

The vaping device operation session—it is the time interval between at least two successive puffs.

According to the present invention, the analytical testing system for vaping devices may be designed with an operating circuit (OC) connected to the measuring circuit (MC), forming an analytical vaping complex (AVC).

The analytical vaping complex is designed for testing most of known vaping devices, such as: e-cigarettes, vaporizers, nebulizers, Heat-not-Burn (HNB) cigarettes and consumables, heated tobacco product (HTP), e-liquids, oils, and other.

Referring to FIG. 1, the analytical testing system for vaping devices structure comprises an operating circuit 500 connected to a measuring circuit 100.

The measuring circuit 100 is formed by a number of measuring units (MU) 101 . . . 106. Each of the measuring units MU 101 . . . 106 is designed as a separate enclosed module equipped with a mechatronic components set. Wherein each of the measuring units 101 . . . 106 comprises an equal mechatronic components set. Also, at least one of the measuring units 101 . . . 106 comprises a dedicated mechatronic components set depending on the testing program. The mechatronic components form a system designed by integrated mechanical components and electrical hardware into one packaging unit, such as named measuring units. Each of measuring unit 101 . . . 106 is equipped with a communication interface for connecting to the main module 300. The communication interface comprises Ethernet, Wi-Fi connection, RJ45 jack and other. In addition, the Operating circuit 500 of FIG. 1 may include a user's personal computing devices, such as a personal computer 107, and remote access means, such as a mobile phone 108, etc.

Figure 2:
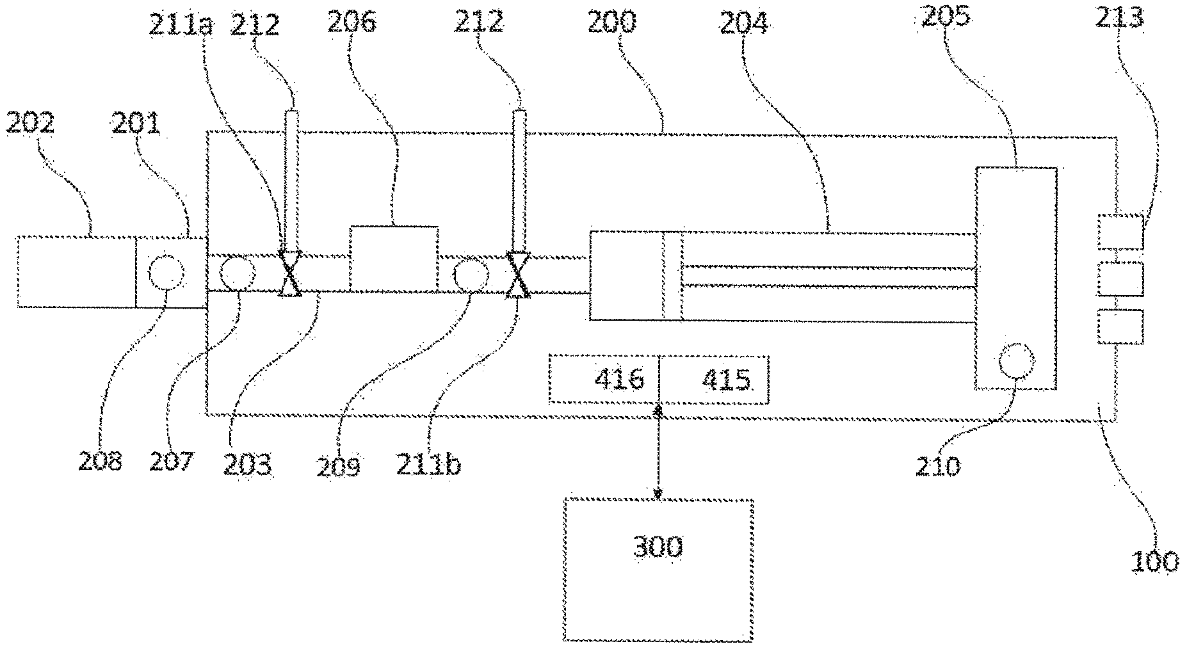
FIG. 2 is the structure of a measuring unit.
Figure 2A:
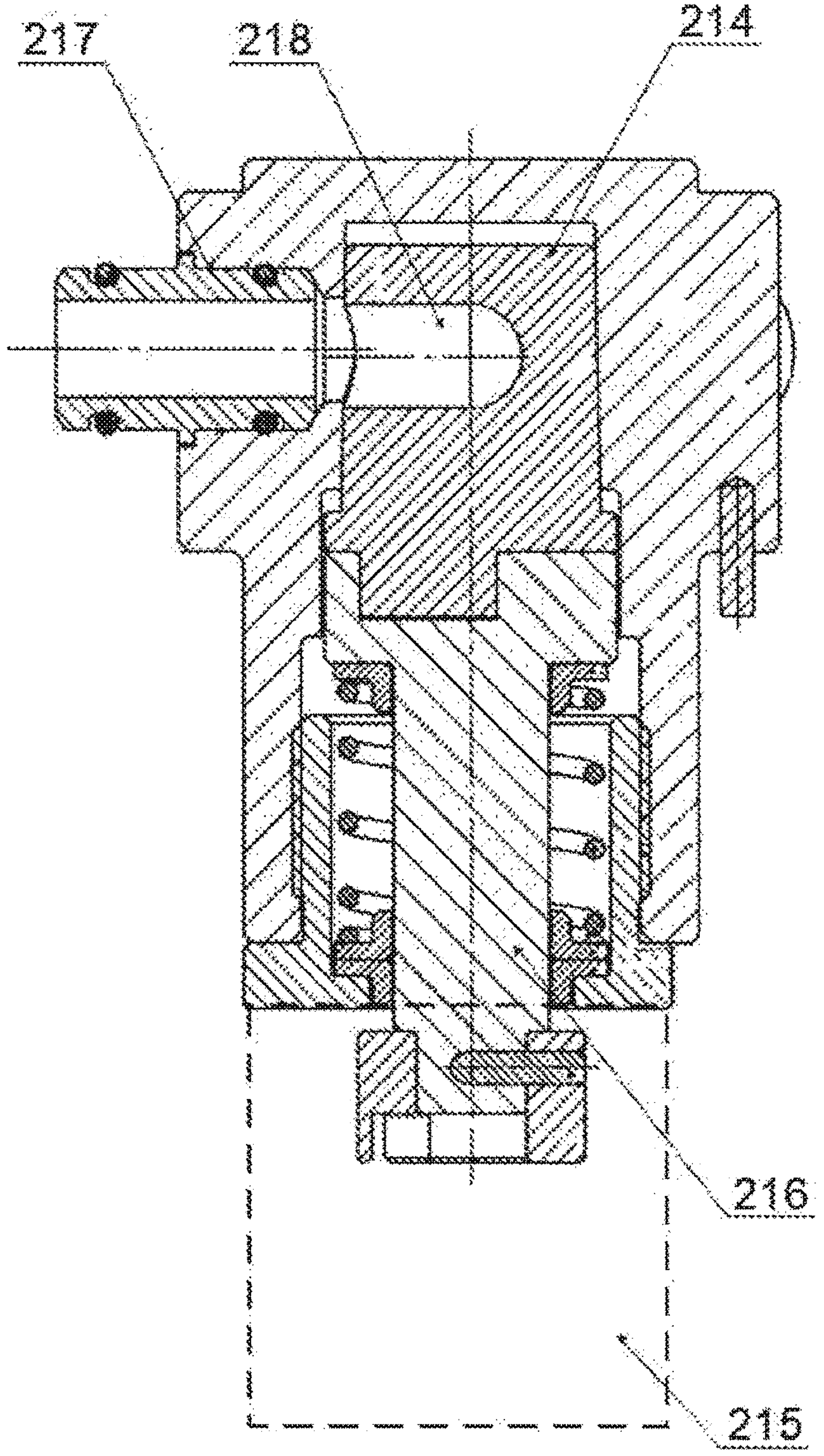
FIG. 2A is the controlled valve structure.

The example of a measuring unit 101 . . . 106 which is a part of the measuring circuit 100 is shown on FIG. 2. The measuring unit 101 . . . 106 composing the mechatronic components sets consists of: a connector 201 for the vaping device 202, the vapor channel 203 for an evaporated product, a pump unit 204 which is driven by a step-motor 205, the vapor flow sensing unit 404 installed within protective housing 206. The protective housing 206 is a part of the vapor channel 203. Also, according to the present version of the invention the measuring unit 101 . . . 106 comprises at least a vapor flow sensing unit 404, a pressure drop sensor 207, a flow temperature sensor 208, a harmful impurities sensor 209, and a step-motor position sensor 210. The step-motor position sensor 210 allows synchronization of the step-motor position according to the position of controlled valves 211*a*; 211*b*. The position of controlled valves 211*a*; 211*b* means a position of the controlled valve cone plug 214 (FIG. 2A) at the moment of the vapor flow initiation and removing vapor out of the enclosure 200 of each measuring unit.

Both of the controlled valves (211*a*; 211*b*) are synchronized with the step-motor 205 depending on the selected testing program. Each of the controlled valves is equipped with an additional step motor 215 connected to the cone plug 214 using a rotating rod 216 with an encoder, which is a part of the additional step-motor 215. The controlled valves (211*a*; 211*b*) are integrated to the vapor channel by using sealed fittings 217. The cone plug 214 comprises at least three inlets 218 which allows to divide the vaping device operation session on at least two puff stages. A first puff stage is forming the vapor flow within the vapor channel (203), and a second paff stage is forming a clean air flow within the vapor channel, forwarding the vapor flow and the clean air flow through the vapor flow sensing unit (404) protective housing 206 successively.

The vapor channel 203 may connect at least some of the mechatronic components connected in different sequences. Referring to FIG. 2, the vapor channel 203 contains a connector 201 for the vaping device 202, a system of vapor flow connecting channels (not shown), at least two controlled valves (211*a*; 211*b*) with protective housing 206 between them. The vapor channel 203 also may comprise an outlet channel 212 for removing vapor out of the enclosure 200 or forming an income clean air flow. The outlet channel 212 may be used for connecting additional equipment for measuring, collecting and analyzing data of the vaping devices operation (not shown on drawings).

The vapor flow sensing unit 404 is installed within protective housing 206. The mentioned sensing unit 404 is based on the optical sensor for determining the vapor structure. Such optical sensors are known from the prior art and may comprise an infrared and a red spectrum optical unit and a reflected light control unit. The vapor flow sensing unit 404 is formed with an ability to measure the vapor flow reflected light, with transmission of a signal with data of the reflected light radiation to the blocks of the operating circuit 500. Wherein protective housing 206 is configured to drain condensate out of the components of the sensing unit 404, at least through internal vapor flow channels within the housing 206.

According to the present version of the invention, a dimension dependence between the measuring unit (101 . . . 106) components are established of the vaping device (202) parameters. Thus, it ensures that the parameters of the constructive elements of the measuring modules 101 . . . 106 affecting the accuracy of the calculations are taken into account. In particular, the length and diameter of the vapor channel 203 for passing the required amount of product, sufficient to obtain the required parameters according to the testing program. Also, the parameters taken into account during measurement of a vaping device are dimension of the vaporizer, the product type etc.

The vapor channel 203 is connected to the pump unit 204 by sealed connection. The pump unit 204 can be made in the form of a piston module, in particular, a high-precision syringe or other known pumping unit that allows initiation of the vapor flow with the puff rate, puff frequency and puff volume. The connection between the pump unit 204 and the step-motor 205 allows calibration with a high accuracy up to 0.1 mL and repeatability of the vapor flow initiation with a specified volume etc.

The accurate calibration with a high accuracy vapor flow initiation is facilitated by the ability of the operating circuit 500 to precisely synchronize the movement of the step-motor 205 with the position of the valves 211*a*; 211*b* by using data from the sensor 210.

The set of sensors 207, 208, 209 of the measuring unit 101 (102 . . . 106) of the measuring circuit 100 is preferably installed within the vapor channel 203. Wherein each measuring unit enclosure 200 is equipped with a connection port 213 provided for connecting additional measuring devices and/or additional equipment (not shown on drawings). For example, additional equipment may be used to create a special environment for vaping devices (with a given temperature, pressure and humidity), mechanical (robotic) control means for vaping devices, additional tools for analyzing vapor and its particles, etc.

According to the present embodiment the measuring circuit 100 referring to FIG. 1 is formed of six separate measuring units 101 . . . 106. Wherein each of said measuring units is connected to the main module 300 of the operating circuit 500 by a communication and data transfer channel. The communication and data transfer channel can be wireless and/or cable. Such design allows simultaneous testing of various types of vaping devices 202 according to an individual testing program with determination of the real-time vaping device stability.

Figure 3:
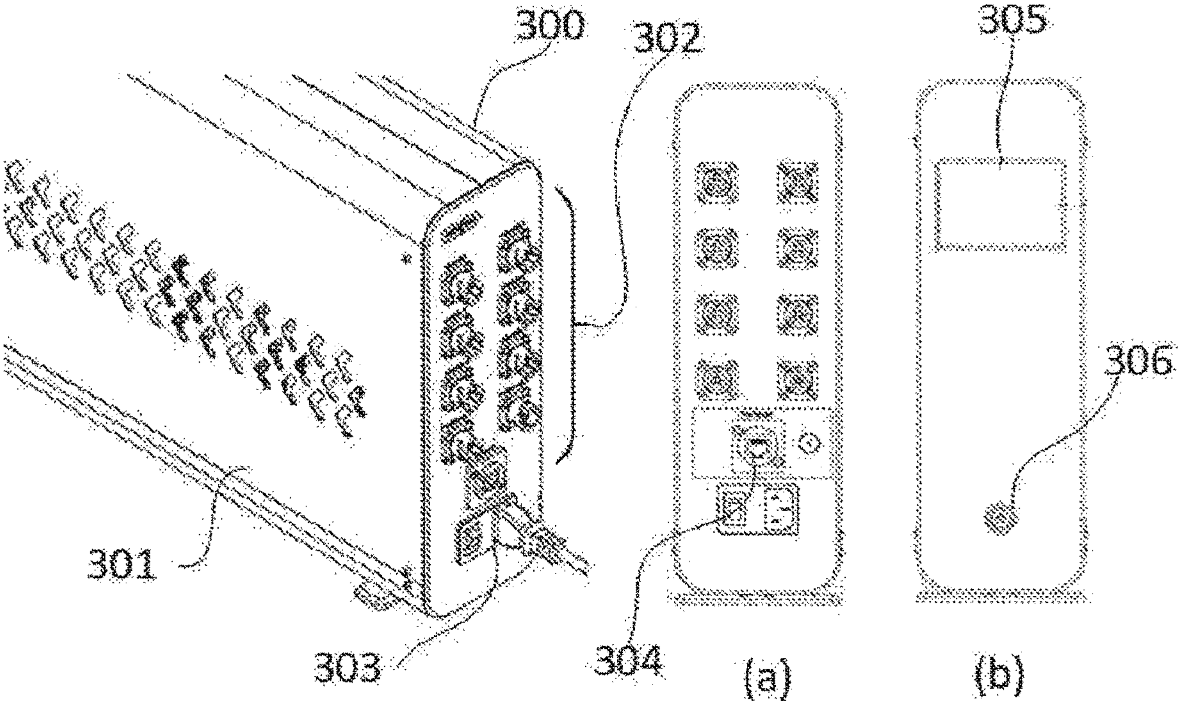
FIG. 3 is the structure of a main module.

Referring to FIG. 3 the main module 300 is designed as a software and hardware system within the monobloc enclosure 301. The main module enclosure 301 comprises on the first side (a) a set of ports 302 positioned for connecting measuring modules 101 . . . 106, a port 303 for connecting power and additional equipment (RJ45 jack), as well as the Ethernet port 304. On the second side (b) of the enclosure 301, a display 305, a start button 306, and other control means a detachable remote control panel (not shown) can be installed.

Figure 4:
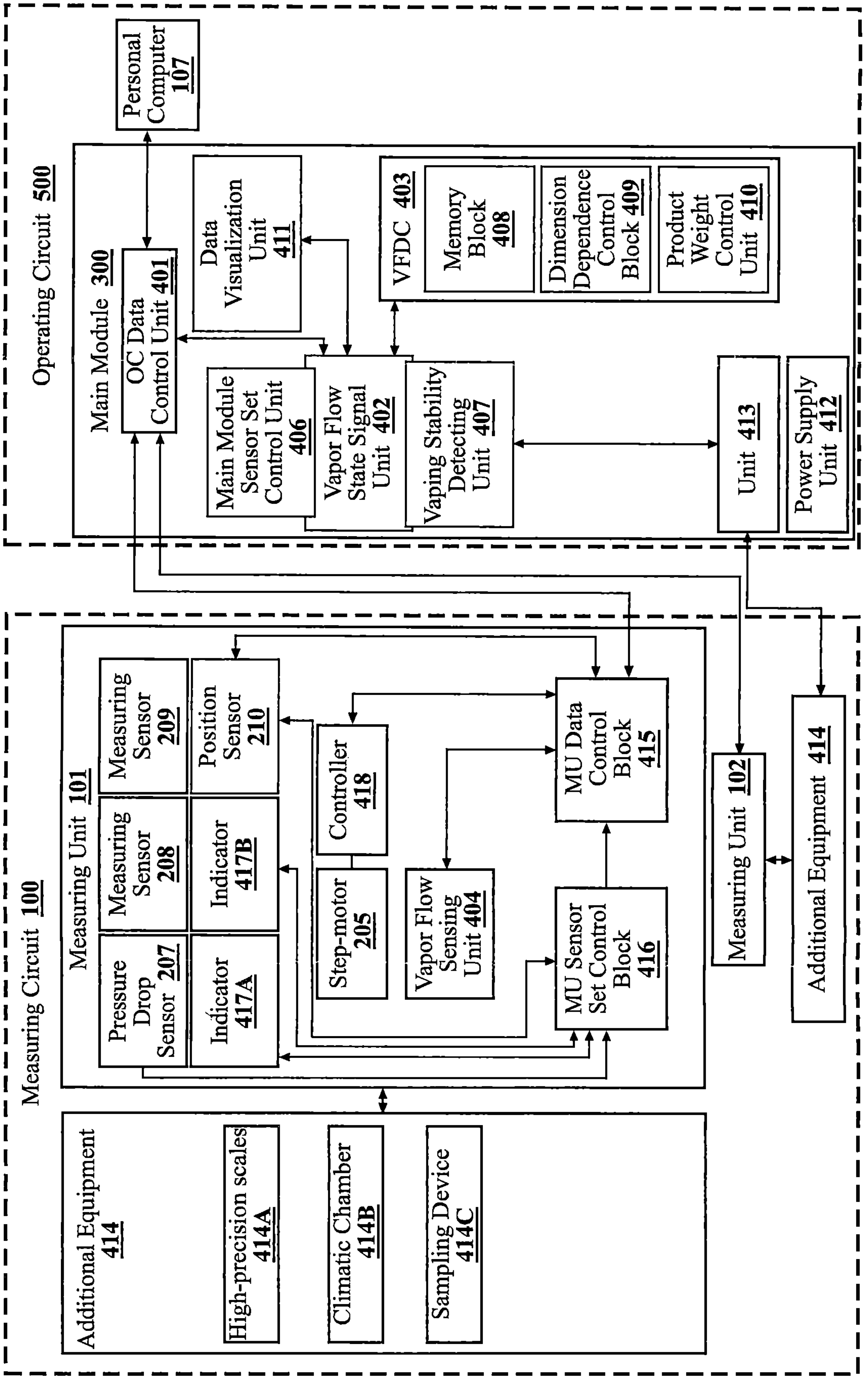
FIG. 4 is the block diagram of an analytical testing system and method for vaping devices.

Referring to FIG. 4, the main module 300 comprises at least an OC data control unit 401, a vapor flow state signal unit (FSCU) 402, a vapor flow density control unit (VFDC) 403. The vapor flow state signal unit 402 is connected to the vapor flow density control unit 403. The VFDC unit 403 includes or functional communicated through the MU data control unit of the measuring circuit with the vapor flow sensing unit 404. The FSCU 402 is connected to the main module sensor set control unit 406 which is controlling the set of sensors 207, 208, 209 of each measuring unit 101 . . . 106. The main module sensor set control unit 406 is also connected to vaping stability detecting unit 407. The VFDC unit 403 consists of a memory block 408 with a parameters database of a vaping device 202, a dimension dependence control block 409 for counting dimension parameters of measuring circuit components, and a product weight control unit 410. The product weight control unit 410 is designed for counting changes of product weight within the vapor during the testing program. The product weight changes allow a high-precision determination of the vapor flow density, also taking into account parameters measured by the vapor flow sensing unit.

The database of the parameters of a vaping device formed in block 408 may contain many parameters characterizing different types of vaping devices, in particular, technical characteristics of known electronic cigarettes (such as structure component dimensions), physical parameters of the evaporated liquid (such as e-liquid density, volume, type), etc.

The vapor flow state signal unit 402 is connected to a data visualization unit 411. The data visualization unit 411 provides visualization of interactive diagrams, an example of such a diagram is shown in (FIG. 8), with the real-time results of the analytical testing system in graphical form.

A version of the present invention is possible, in which at least blocks 402 and 411 are formed on a remote server connected via Internet to the user's device 107; 108 and to the measuring circuit 100. In such a version, the unit 411 is showing the real-time interactive diagrams (FIG. 8) with visualized parameters using a web-browser environment of a user's device 107; 108 device. The web-browser interface allows to control each measuring module separately and provides the following functions: the Test program settings, Calibration, Start, Clean after sessions, etc.

The main module 300 also comprises a power supply unit 412 and a unit 413 for connecting additional equipment 414, which can be represented in the form of a high-precision scales 414*a*, a climatic chamber 414*b*, a sampling device 414*c*, etc. Each of the measuring units 101 . . . 106 is equipped with an electronic processing module providing data processing functions. The data processing functions realized by means of the MU data control block 415 are designed in data connection with a MU sensor set control block 416. Wherein the MU sensor set control block 416 provides the data exchange with subsequent transfer of data to the modules of the operating circuit 500. In this case, the block 416 is connected to the measuring sensors 207, 208, 209, as well as indicators 417*a*, 417*b* of the the position of the controlled valves 211*a* and 211*b*, with the controller 418 of the step-motor 205. The controller 418 processes signals of the step-motor 205 position sensor 210. The step-motor 205 operation is realized through a separate controller 418. The controller 418 provides the pump module 204 position and synchronizes the operation of the step-motor 205 with the position of valves 211*a* and 211*b*.

Figure 5:
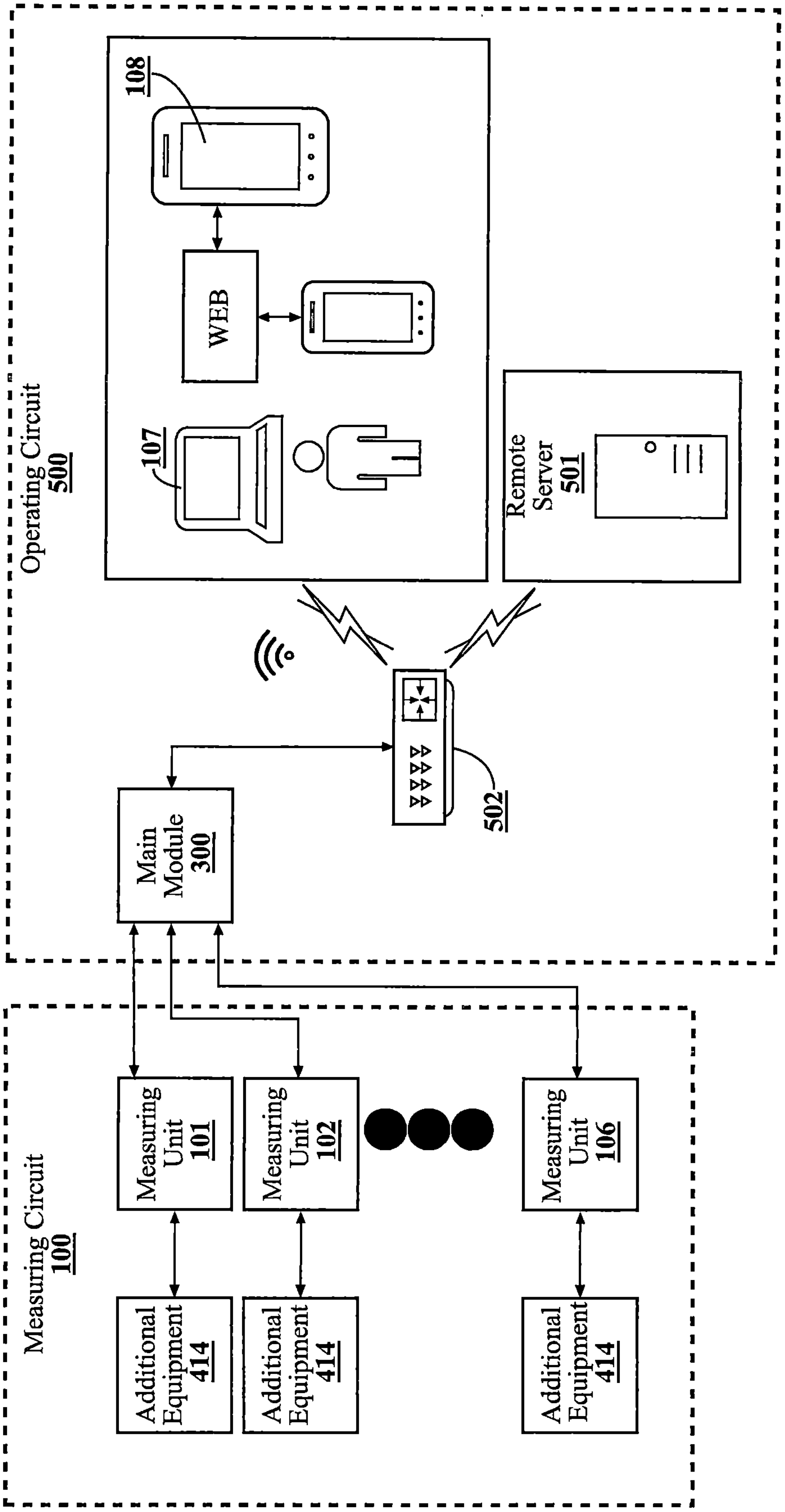
FIG. 5 is the data flow diagram of an analytical testing system and method for vaping devices.

Referring to FIG. 5 the analytical vaping complex (system) comprises the measuring circuit 100 and the operating circuit 500. Wherein the operating circuit 500 can comprise the user's device 107, 108 and/or remote server 501 in data communication through a router 502. In one of the embodiments the remote server 501 can duplicate the functions of the main module 300, which directly follow from the present description.

Figure 6:
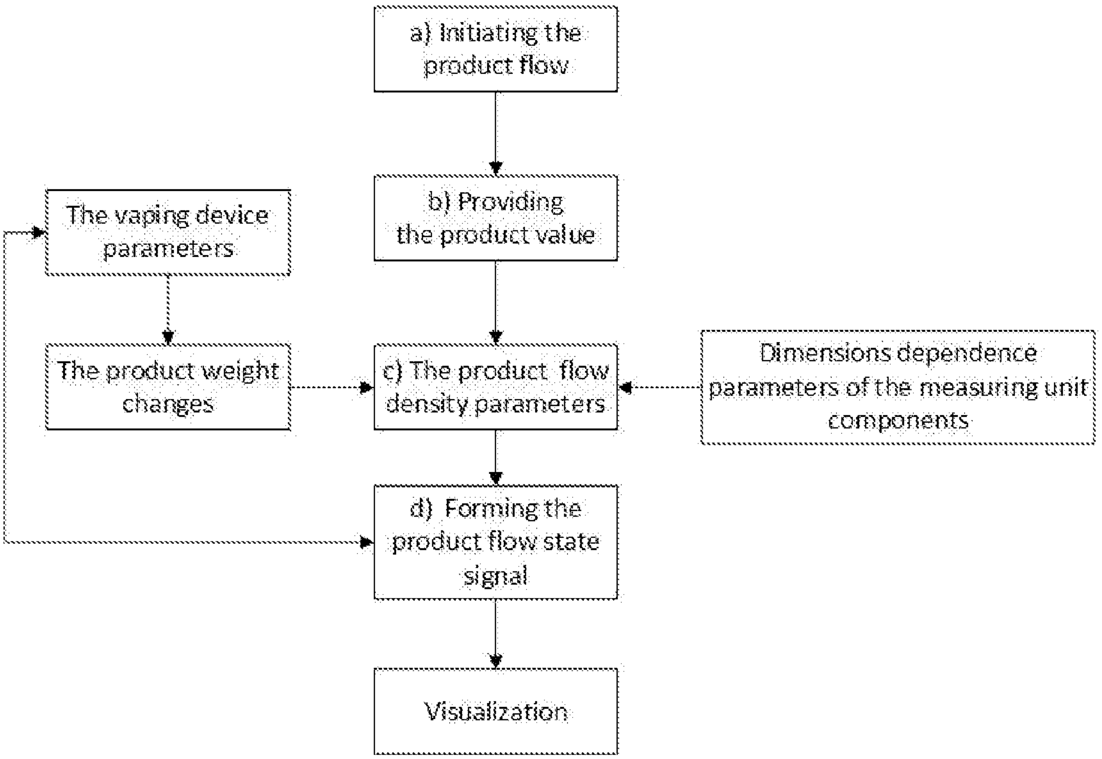
FIG. 6 is steps determining the flow state within a vapor channel.
Figure 7:
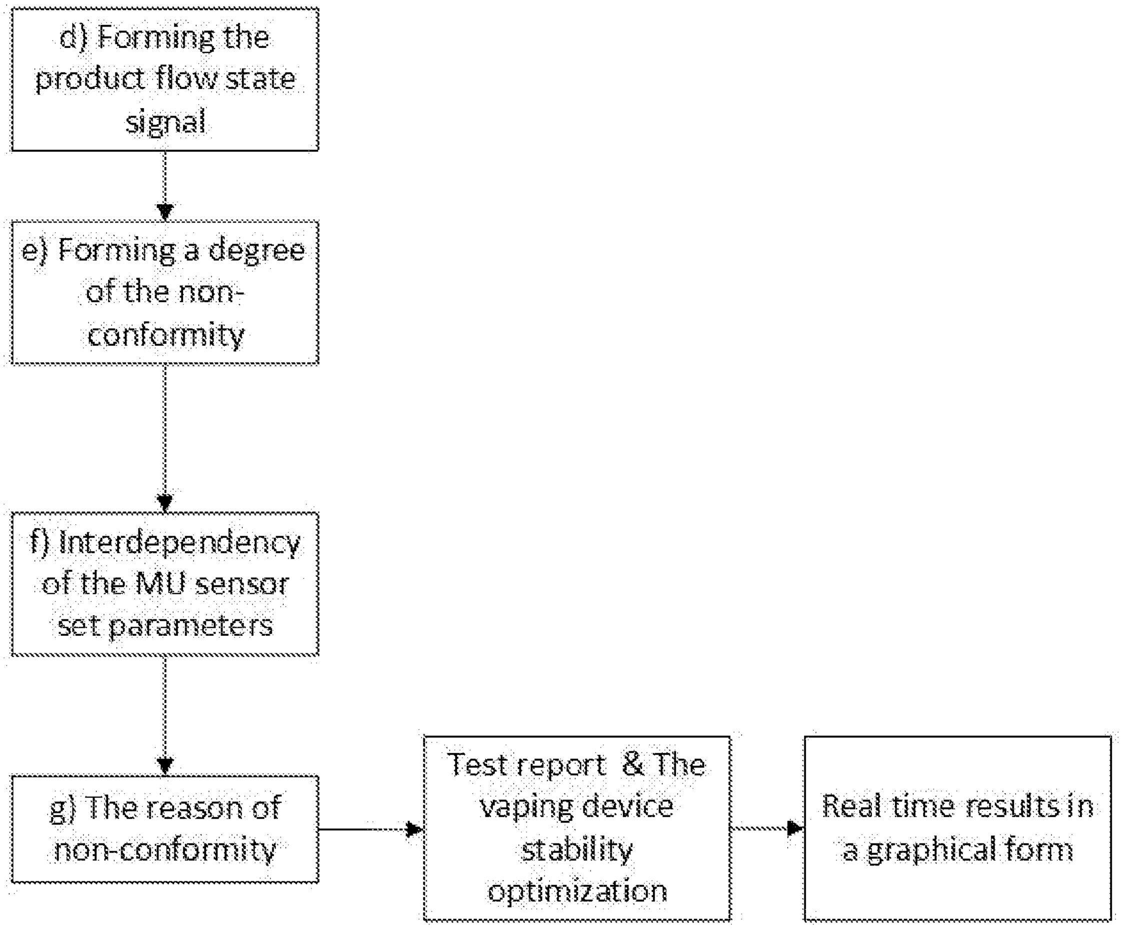
FIG. 7 is the flowchart for determining the stability of a vaping device.

Referring to FIGS. 6 and 7 the variants of the analytical method for testing vaping devices are described.

Figure 8:
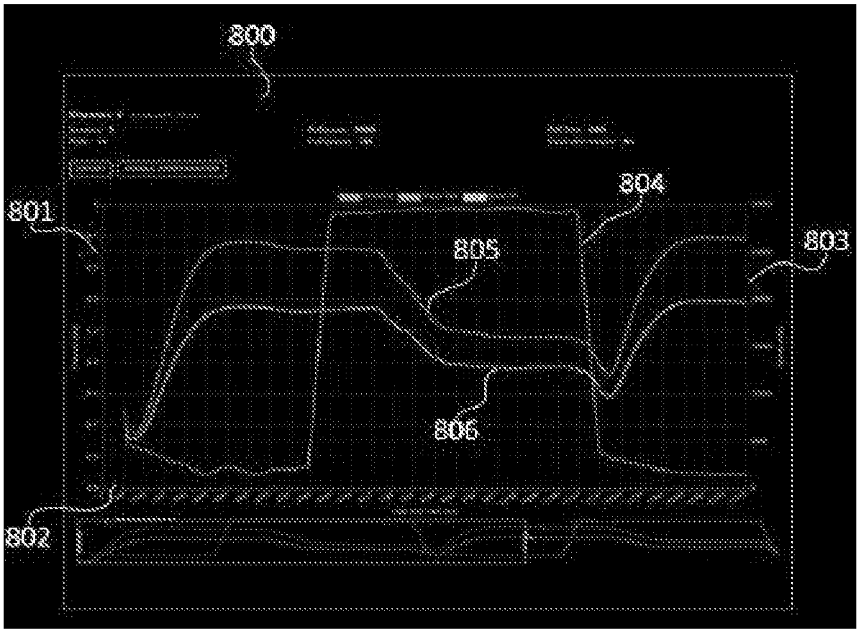
FIG. 8 is visualization of an analytical testing system and method.

Determination of the vapor flow state within the vapor channel is provided according to following steps: a) initiating the vapor flow by the pump unit 204 setting the puff volume and the puff rate. On this step providing the position of the controlled valves 211*a* 211*b* related to the piston of a pump unit 204 and the step-motor 205. The control signal is generated by the main module 300 of the operating circuit 500, preliminarily providing synchronization of the position of an actuating element of the pumping module and the controlled valves; b) Providing flow state parameters characterizing the product value within the vapor flow. This parameter is determined based on the signal of the vapor flow sensing unit 404; c) Relating values of the flow state parameters obtained at the stage (b) to the vapor flow density parameters, based on the data collected by the memory block 408 counting the parameters of a vaping device 202, dimension dependence parameters of the components of the measuring unit 101, and the product weight changes determined by the unit 410; d) Forming the vapor flow state signal. Indicating conformity/non-conformity (with objective value according to the vaping device technical characteristics and test program). At this stage, the vapor flow state signal parameters dynamic changing is compared with the data from the database 408 and the result is put out through the 411 visualization unit. The real-time changes are shown in graphic form (FIG. 8). If the vapor flow state is within the normal range, in the result of the entire testing program cycle, it indicates the stability of a vaping device is in conformity. After that the vaping device testing program may be terminated.

According to the present embodiment, the vapor flow state signal is substantially based on the vapor flow density parameter fixed within the vapor channel (203). Wherein the vapor flow density dynamic parameter is based on at least the vapor flow reflected light signal related to the weight of the vaping device, the product type, the dimension dependence parameters of the measuring unit (101) components. Each testing program may have a vapor density limit which must be set, for example as 3000-5000 units. This setting performs an automatic stop of the vaping device test if the vapor amount becomes low during the test (device discharged or liquid tank empty indication).

Referring to FIG. 7 the vaping device stability determination substantially, includes all the steps of the vapor flow state determination (FIG. 6), after which the following steps are comprised: e) Forming a degree of non-conformity. If non-conformity was detected in step (d); f) Comparing and analyzing an interdependence of the MU sensor set parameters depending on dynamic changing of at least one of the flow state parameters fixed within the vapor channel (203), such as the vapor flow density dynamic parameters; g) Forming the reason for non-conformity.

Using dynamic changing of at least one of the flow state parameters as a marker of the real-time instability of a vaping device. Based on the real-time vapor flow state signal value comparing and analyzing the interdependence of the MU sensor set 207; 208; 209 parameters and detecting the stability parameters of a vaping device. Forming the vaping device testing report, and providing the real-time stability parameters of a vaping device with a task or a tip for optimization of the stability of a vaping device.

Examples of monitoring the flow state parameters as part of evaluating the real-time stability of a vaping device: "liquid tank is empty"—the operation circuit (units 402; 403) fixing a dynamic decrease of the vapor flow density within the level indicates an absence of a product in the vapor flow, while the system takes into account an additional parameter, for example, the harmful impurities sensor 209, such as CO (carbon monoxide) sensor and forming a report on non-conformity of the stability of a vaping device, with the possibility of determining causes; "Pressure drop"—the operation circuit (units 402; 403) fixes a dynamic decrease of the vapor flow density within the level indicating pressure drop. In this case as an additional parameter the pressure drop sensor data may be used; "High temperature"—the operation circuit (units 402; 403) fixing a dynamic increase of the vapor flow density within the level indicates an excessive heating temperature of the product by the vaping device.

Each example using the units 406 and 407 to compare and analyze the interdependence of the MU sensor set parameters and detect the stability parameters of a vaping device depending on the data of the required sensors. Possible embodiments of the invention allow to monitoring the product weight parameters and the vapor flow composition based on at least the vapor flow reflected light signal using a combination of different wavelengths in a visible and/or a non-visible spectrum.

The above examples are not limited and may have corresponding indicators displayed by the users' devices 107, 108 or shown on the display of the main module 300. A list of parameters influencing the stability of a vaping device according to the vapor flow density changes flow can be expanded by experimental, mathematical modeling and other ways. A variety of tests, as well as calculated results, can be used to train the analytical system to respond with a higher accuracy according to vapor flow changes.

Referring to FIG. 8 the analytical testing system and method visualization is presented in the graphic form. According to the present embodiment the real time diagram 800 is showing:

The left axis 801 of the chart is the pressure drop value in millibars.

The lower axis 802 of the chart is the time from the start of the testing program in seconds.

The right axis 803 of the chart is the amount of vapor flow density.

The top diagram 804 reflects the pressure drop changes.

The first down diagram 805 reflects the amount of vapor in the red spectrum.

The second down diagram 806 reflects the amount of vapor in the infrared spectrum.

The implementation of the claimed invention allows to solve a set of technical problems with creating the system and method to provide the real-time control of the stability of a vaping device by defining a group of parameters. Wherein the vaping device stability is defined through determination of a particular parameter based on the identified factors affecting the stability of a vaping device in the complex. Defining the parameters is realized with a high speed and accuracy. Dividing the operating circuit (500) into two parts, with the first operating circuit part on the basis of the main module (300), and the second operating circuit part within a web-browser environment based on a user's device (107; 108), allows to show the real-time stability parameters of a vaping device within a web-browser environment without any additional applications and hardware components.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An analytical testing system for vaping devices comprises:

an operating circuit connected to a measuring circuit, the operating circuit comprising a main module, the measuring circuit comprising a plurality of measuring units each configured as an independently enclosed testing module configured to receive and operate a vaping device under test, each measuring unit comprising:

a vaping device connector, a vapor channel defining a controlled vapor flow path, a pump unit configured to generate a controlled puff profile, a vapor flow sensing unit disposed within the vapor channel, a first control valve positioned upstream of the vapor flow sensing unit and a second control valve positioned downstream of the vapor flow sensing unit, the first and second control valves being synchronously actuated by a step motor to regulate vapor flow through the vapor channel, wherein the operating circuit receives measurement data from the measuring units to determine vaping stability parameters.

2. The analytical testing system for vaping devices according to the claim 1, wherein each of the measuring unit comprises an equal mechatronic components set.

3. The analytical testing system for vaping devices according to the claim 1, wherein at least one of the measuring units comprises a dedicated mechatronic components set.

4. The analytical testing system for vaping devices according to the claim 1, wherein each of the measuring unit comprises at least the vapor flow sensing unit, a pressure drop sensor, a flow temperature sensor, a harmful impurities sensor, a step-motor position sensor.

5. The analytical testing system for vaping devices according to the claim 1, wherein the vapor flow sensing unit is installed within protective housing.

6. The analytical testing system for vaping devices according to the claim 1, wherein a dimensions dependence between the measuring unit components are established based on the vaping device parameters.

7. The analytical testing system for vaping devices according to the claim 1, wherein the vapor flow density control unit comprises, at least, a memory unit with the vaping devices parameters database, a dimensions dependence control unit, a product weight control unit.

8. The analytical testing system for vaping devices according to the claim 1, wherein the main module comprises the vapor flow state signal unit which is designed in data connection with the measuring unit sensor set control unit and the vaping stability detecting unit.

9. The analytical testing system for vaping devices according to the claim 1, wherein the vaping stability detecting unit is designed in data connection with the data visualization unit.

* * * * *